US011871762B2

(12) United States Patent
Arends et al.

(10) Patent No.: US 11,871,762 B2
(45) Date of Patent: Jan. 16, 2024

(54) PROCESS FOR THE PREPARATION OF EDIBLE FAT-CONTINUOUS SPREADS

(71) Applicant: UPFIELD EUROPE B.V., Rotterdam (NL)

(72) Inventors: Berend Jan Arends, Spijkenisse (NL); Christiaan Michael Beindorff, Capelle aan den Ijssel (NL); Albert Jan Bezemer, Spijkenisse (NL); Teunis de Man, Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 2689 days.

(21) Appl. No.: 14/359,133

(22) PCT Filed: Nov. 6, 2012

(86) PCT No.: PCT/EP2012/071878
§ 371 (c)(1),
(2) Date: May 19, 2014

(87) PCT Pub. No.: WO2013/079279
PCT Pub. Date: Jun. 6, 2013

(65) Prior Publication Data
US 2014/0342066 A1  Nov. 20, 2014

(30) Foreign Application Priority Data
Nov. 30, 2011 (EP) .................................... 11191275

(51) Int. Cl.
*A23D 7/04* (2006.01)
*A23D 7/005* (2006.01)
*A23D 7/02* (2006.01)

(52) U.S. Cl.
CPC ............. *A23D 7/04* (2013.01); *A23D 7/0056* (2013.01); *A23D 7/02* (2013.01)

(58) Field of Classification Search
CPC ........... A23D 7/0056; A23D 7/02; A23D 7/04
USPC ....................................................... 426/417
See application file for complete search history.

(56) References Cited

U.S. PATENT DOCUMENTS 5,614,245 A  3/1997  Gupta et al.
8,147,895 B2  4/2012  Barendse et al.

FOREIGN PATENT DOCUMENTS

| EP | 1651338 B1 | 5/2006 | |
|---|---|---|---|
| EP | 1865786 | 11/2011 | |
| GB | 2158452 | 11/1985 | |
| NL | WO 2006087091 A2 * | 8/2006 | ........... A23D 7/0056 |
| WO | WO2005014158 A1 | 2/2005 | |
| WO | WO2006087091 | 8/2006 | |
| WO | WO2006087093 | 8/2006 | |
| WO | WO2010069752 A1 | 6/2010 | |

OTHER PUBLICATIONS

Munuklu et al., "Particle formation of edible fats using teh supercritical melt micronization process (ScMM)" J. of Supercritical Fluids 43, pp. 181-190 (2007).*
C. Ross., "Benefits and techniques of vacuum mixing". Available online at https://www.mixers.com/insights/mti_35.pdf on Jun. 21, 2011. (Year: 2011).*
Singh et al., "Properties of Starches Modified by Different Acids" International Journal of Food Properties, 11: 495-507. (Year: 2008).*
Elvers et al, Margarines and shortenings, Ullmanns Encyclopedia of Industrial Chemistry, 1990, 156-158, 5th Edition, vol. A16.
Francis et. al, A study of de-gassed oil in water dispersions as potential drug delivery systems, Colloids and Surfaces A: Physicochem. Eng. Aspects 260 (2005) Jul. 16, 2005, pp. 7-16, vol. 260.
Francis et. al., The effect of de-gassing on the dispersion of fine oil droplets in water, Colloids and Surfaces A: Physicochem. Eng. Aspects 287 (2006) 36-43, 2006, pp. 36-43, vol. 287.
IPRP2 in PCTEP2012071878, Jan. 22, 2014.
Munuklu, Experimental and Analytical Facilities, Delft University of Technology 2005 4 pp. 41-51, Dec. 16, 2005, 41-51.
P. Munuklu et al., Erratum—Particle formation of edible fats using the supercritical melt micronization process (ScMM), Journal of Supercritical Fluids, 2007, 181-190.
Search Report in PCTEP2012071878, dated Jan. 18, 2013.
Written Opinion in PCTEP2012071878, dated Jan. 18, 2013.

* cited by examiner

*Primary Examiner* — Nikki H. Dees
*Assistant Examiner* — Assaf Zilbering
(74) *Attorney, Agent, or Firm* — ARENTFOX SCHIFF LLP

(57) ABSTRACT

Process for the preparation of an edible fat-continuous spread comprising at most 45 wt. % of fat using liquid oil, a fat powder comprising structuring fat and a water-phase, comprising the steps of: a. providing a mixture comprising the water-phase and the fat powder; b. subjecting said mixture to at least a partial vacuum; c. mixing the mixture prepared at step 'b' to provide a fat-continuous spread, wherein the liquid oil may be added to the mixture at any of steps 'a', 'b', or 'c' or when added in parts in any combination at steps 'a', 'b' and 'c'.

18 Claims, No Drawings

PROCESS FOR THE PREPARATION OF EDIBLE FAT-CONTINUOUS SPREADS

FIELD OF INVENTION

The present invention relates to a process for the preparation of fat-continuous spreads comprising the step of subjecting a mixture of fat powder and a water-phase to at least a partial vacuum.

BACKGROUND OF INVENTION

Edible fat-continuous spreads like e.g. margarine and low fat spreads are well known food products that comprise a continuous fat-phase and a dispersed water-phase.

Margarine is generally defined as a composition containing at least 80 wt. % of fat and about 20 wt. % of a water-phase. In contrast, emulsions containing less than 80 wt. % fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably. Margarine may be used for different applications including spreading, (shallow) frying and baking. In the market place margarine is generally sold as one of three principal types, namely hard or stick margarine (generally referred to as wrapper margarine), soft or tub margarine and liquid or pourable margarine.

The fat-phase of margarine and similar edible fat-continuous spreads comprises a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil, (maize oil) and blends of vegetable oils. The solid fat, also called structuring fat or hardstock fat, serves to structure the fat-phase by forming a fat crystal network throughout the continuous oil-phase. It also helps to stabilize the emulsion. The droplets of the water-phase are fixed within the spaces of the lattice of solid fat crystals. This prevents coalescence of the droplets and separation of the heavier water-phase from the fat-phase.

For an edible spread, ideally the structuring fat has such properties that it melts or dissolves at in-mouth conditions, otherwise the product may have a heavy and/or waxy mouthfeel. Furthermore, the overall organoleptic impression should be smooth and preferable no perceivable grains should be present upon ingestion as this may result in what is generally known as a 'sandy', 'grainy' and/or 'lumpy' mouthfeel. Other important aspects of an edible spread are for example hardness, spreadability and stability (e.g. storage stability and the ability to withstand temperature cycling). Temperature cycling means that the product is subjected to low and high temperatures (e.g. when the consumer takes the product out of the refrigerator and leaves it for some time at the table prior to use). An inadequate stability may for example lead to destabilization of the emulsion, oil exudation and/or uncontrolled crystal growth.

Generally, edible fat-continuous spreads are prepared according to known processes that encompass the following steps:
1. Mixing of the liquid oil, the structuring fat and if present the water-phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the water-phase) is subjected to a heating step and a cooling step, which requires a lot of energy. Another disadvantage of the known processes is that the choice of fats that can practically be used as structuring agent is rather limited. Moreover the amount of saturated fatty acids (SAFA) in the structuring agent is usually relatively high. Also trans fatty acid may be present. Some experts have called for reductions in these fatty acids to improve cardiovascular health.

Some consumers prefer spreads that have a low energy density (for example products that are low in total fat) and/or are low in SAFA but still have a good nutritional profile (by for example providing essential fatty acids like omega-3 and omega-6). Thus there is a need for edible fat-continuous spreads with a low fat content like for example 45 wt. % or less.

Alternative processes have been disclosed wherein the structuring fat is added as fat powder (i.e. pre-crystallized fat) thereby eliminating the need to heat the whole composition to above the melting temperature of the structuring fat. An example of such a process can be found in WO2010/069752.

Generally, edible spreads made using fat powder are prepared according to the following steps:
a. mixing of fat powder and liquid oil to provide a slurry;
b. providing a water-phase;
c. mixing the slurry and the water-phase to form a fat-continuous spread, wherein the fat-powder is typically not subjected to a temperature above 25 degrees Celsius.

A commonly used fat powder is micronized fat powder, which is for example obtainable by a Super Critical Melt Micronisation process, as described in J. of Supercritical Fluids 43 (2007) 181-190 and EP1651338. A problem arising from the use of fat-powder is that it may be fluffy and may lead to the incorporation of gas-bubbles into the final spread. The incorporation of gas-bubbles may result in spreads with a poor stability, poor spreading characteristics and the occurrence of free water. Therefore, measures are taken to avoid incorporation of gas into the final spread when using fat-powder to prepare fat-continuous spread, which may be time-consuming and inconvenient.

It is an object of the present invention to provide a more convenient and/or cheaper process, preferably with a reduced processing time, for the preparation of low fat edible fat-continuous spreads which are stable.

SUMMARY OF THE INVENTION

It was found that the above objective is attained by a process for the preparation of an edible fat-continuous spread comprising at most 45 wt. % of fat using liquid oil, a fat powder comprising structuring fat and a water-phase, comprising the steps of:
  a. providing a mixture comprising the water-phase and the fat powder;
  b. subjecting said mixture to at least a partial vacuum;
  c. mixing the mixture prepared at step 'b' to provide a fat-continuous spread, wherein the liquid oil may be added to the mixture at any of steps 'a', 'b', or 'c' or when added in parts in any combination at steps 'a', 'b' and 'c'.

In a typical process for the preparation of an edible spread using fat powder, a slurry is prepared of the fat powder and the liquid oil. Said slurry is then typically degassed by applying a partial vacuum to reduce gas-bubble incorporation into the final product. The presence of gas-bubbles in the final product may lead to spreads with a reduced stability, poor spreading characteristics and the occurrence of free water. The fat-continuous spread is prepared by mixing the degassed fat-slurry with the water-phase.

In the process according to the invention a mixture of the fat powder and the water-phase is provided and subjected to at least a partial vacuum. Surprisingly it was found that said process has a reduced processing time, allows efficient degassing and that even though the fat powder is provided in a mixture which is water-continuous a stable and edible final spread may result.

DETAILED DESCRIPTION OF THE INVENTION

Weight percentage (wt. %) is based on the total weight of the composition unless otherwise stated. The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' or 'hardstock fat' refers to a fat that is solid at ambient temperature. The ambient temperature is defined as 20 degrees Celsius.

The process of the present invention uses fat powder comprising structuring fat and does not require the heating and cooling of the whole composition to form the crystal network in the spread. Such processes have been described previously in for example EP 1865786 A. This process is characterized in that (part of) the structuring fat is pre-crystallized and does not form from the fat phase (comprising the structuring fat and liquid oil) optionally including the aqueous phase as is the case in conventional ways of preparing a spread. One of the main advantages of this process is that it requires less energy to make.

Fat Powder

The fat powder comprises structuring fat and preferably comprises at least 80 wt. % of structuring fat, more preferably at least 85 wt. %, even more preferably at least 90 wt. %, even more preferably at least 95 wt. % and even more preferably at least 98 wt. %. Still even more preferably the edible fat powder essentially consists of structuring fat.

The structuring fat may be a single fat or a mixture of different fats. The structuring fat may be of vegetable, animal or marine origin. Preferably at least 50 wt. % of the structuring fat (based on total amount of structuring fat) is of vegetable origin, more preferably at least 60 wt. %, even more preferably at least 70 wt. %, even more preferably at least 80 wt. %, even more preferably at least 90 wt % and even more preferably at least 95 wt. %. Still even more preferably the structuring fat essentially consists of structuring fat of vegetable origin.

The structuring fat as present in the edible fat powder preferably has a solid fat content N10 from 50 to 100, N20 from 26 to 95 and N35 from 5 to 60.

The amount of fat powder used is suitably chosen such that the required structuring (i.e. stable emulsion) is obtained. It will be appreciated that the amount of fat powder depends on the amount of structuring fat in the fat powder and the desired amount of structuring fat on total product. Preferably the amount of structuring fat on total amount of product is 1 to 20 wt. %, more preferably 2 to 15 wt. % and even more preferably 4 to 12 wt. %.

Suitable methods to prepare the fat powder include for example Super Critical Melt Micronisation (ScMM), also known as particles from gas saturated solutions (PGSS). This is a commonly known method and is for example described in J. of Supercritical Fluids 43 (2007) 181-190, EP1651338 and WO2005/014158.

The process according to the invention is especially beneficial when used with fat powder that has been prepared using a ScMM process. Preferably the fat powder used in the process according to the invention is micronized fat powder and more preferably is micronized fat powder obtainable by supercritical melt micronisation.

It is important that the fat powder is not subjected to temperatures at which the structuring fat melts as this severely reduces the ability to structure. This temperature depends on the structuring fat used and can routinely be determined for example based on the solid fat content profile (i.e. N-lines) of the structuring fat. Preferably the fat powder, after production, has not been subjected to temperatures above 25 degrees Celsius.

Water-Phase

The water-phase is prepared according to the standard way in accordance with the chosen ingredients. The water-phase may comprise ingredients like for example salt, acidifying agent and/or preservative. The water-phase may also comprise oil, for example to aid the inclusion of hydrophobic ingredients in the water-phase. The water-phase may also comprise proteins like for example dairy protein. The water-phase may also comprise commonly known gelling and/or thickening agents and include for example polysaccharides like starches, vegetable gums, pectin and gelling proteins. It has been observed that some gelling agents present in the water-phase, such as gelatin, may phase separate during step 'a' and/or step 'b'.

Preferably the water-phase does not comprise gelling proteins and more preferably does not comprise gelatin. This problem was not observed for typical gelling and/or thickening agents such as those based on physically and/or chemically modified starch. Preferably the water-phase comprises at least one gelling and/or thickening agent selected from the group consisting of physically and chemically modified starch and more preferably selected from the group consisting of starch which has been subjected to cross-linking using phosphoric acid and tapioca starch which has been subjected to cross-linking using phosphoric acid.

Mixture of Water-Phase and Fat Powder

A water-phase and fat powder may be brought into contact with each other to provide a mixture of the water-phase and the fat powder at step 'a'. Preferably the temperature of said mixture is equal to or below 25 degrees Celsius. Thus depending on the temperature of the fat powder the water-phase may have to be cooled down prior to mixing. Suitable devices include for example a tubular heat exchanger or the like.

Preferably at least 25 wt. %, more preferably at least 50 wt. %, even more preferably at least 75 wt. % and still more preferably at least 95 wt. % of the total weight of the water-phase is present in said mixture. Preferably at least 25 wt. %, more preferably at least 50 wt. %, even more preferably at least 75 wt. % and still more preferably at least 95 wt. % of the total weight of the fat powder is present in said mixture. Any fat-powder and/or water-phase not provided in the mixture at step 'a' may be suitably added after step 'a' but preferably before or during the mixing step 'c'.

Subjection to at Least Partial Vacuum

The average gas-pressure at sea level is about 101 kPa, however, the local atmospheric pressure may vary according to various factors such as height above sea level, temperature and even local weather conditions. Furthermore, the indoor pressure may be maintained at a different level from the outdoor pressure. For example, pressurized rooms are typically used to prevent airborne contaminants entering the room from outside. For the purpose of the present invention ambient pressure is defined as the pressure in the immediate vicinity of (i.e. outside) the enclosure holding the mixture. It will be appreciated that in the process according to the invention the mixture of water-phase and fat powder is suitably enclosed to allow at least a (partial) vacuum to form at step 'b'. A (partial) vacuum indicates that the gas pressure (of the headspace) inside the enclosure is below the ambient pressure. For example, in case the ambient pressure is 120 KPa (e.g. the room wherein the enclosure is present is pressurized) a pressure inside the enclosure of 100 kPa is considered a partial vacuum. For example, if the ambient pressure is 99 kPa, a pressure inside the enclosure of 90 kPa will be considered a partial vacuum.

Preferably the partial vacuum at step 'b' is at most 70%, more preferably at most 50%, even more preferably at most 30%, even more preferably at most 15%, even more preferably at most 5% and still more preferably is at most 0.5% of the ambient pressure.

Preferably the mixture at step 'b' is subjected to at least a partial vacuum for 1 to 60 minutes, more preferably 3 to 50 minutes, even more preferably 5 to 35 minutes and still more preferably 8 to 15 minutes.

Mixing to Provide a Water-Continuous Slurry

Preferably before step 'c', more preferably at step 'a' or 'b' and even more preferably at step 'b'; the mixture of fat powder and water-phase is mixed to provide a water-continuous slurry. A water-continuous slurry is formed by dispersing the fat powder in the water-continuous phase. The water-continuous slurry may be prepared using standard mixing equipment common in the field of spreads making for such use, like for example obtainable from Esco-Labor. Said mixing of the fat powder and water-phase into a slurry further reduces the degassing time while still allowing a stable spread to be prepared.

Addition of Liquid Oil

The oil used in the process according to the invention may be a single oil or a mixture of different oils, and may comprise other components. Preferably at least 50 wt. % of the oil (based on total amount of oil) is of vegetable origin, more preferably at least 60 wt. %, even more preferably at least 70 wt. %, even more preferably at least 80 wt. %, even more preferably at least 90 wt. % and even more preferably at least 95 wt. %. Still even more preferably the oil essentially consists of oil of vegetable origin. The liquid oil fraction preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae are considered vegetables.

The liquid oil may be added to the mixture of fat powder and water-phase at any of steps 'a', 'b', or 'c' or when added in parts in any combination at steps 'a', 'b' and 'c'. It will be appreciated that this indicates that liquid oil may be suitably added at any time point or time points during the process but should be present at step 'c'. For example, the whole of the liquid oil may be added at step 'a'. For example, part of the liquid oil may be added at step 'a' and the remaining part at step 'c'. For example, liquid oil may be added between step 'b' and 'c'. Preferably part of the liquid oil is added to the mixture at steps 'a' or 'b', or in parts at steps 'a' and 'b', to form a water-continuous mixture.

Preferably 1 to 80 wt. %, more preferably 5 to 65 wt. %, even more preferably 10 to 40 wt. (%) and still even more preferably 15 to 25 wt. % of the liquid oil is added at steps 'a' or 'b', or in parts at steps 'a' and 'b'. The addition of part of the liquid oil in said preferred ranges was found to further reduce the processing time and the chance of uncontrolled inversion of the water-continuous mixture before step 'c'.

In the process according to the invention, the mixture of fat powder and water-phase provided in step 'a' is water-continuous and should remain water-continuous at least up to and during step 'b'. This also applies when liquid oil is present in the mixture. Preferably at least up to and during step 'b' (e.g. at step 'a' and 'b') the temperature of the mixture comprising fat powder and water-phase is 1 to 15, more preferably 5 to 13 and even more preferably 8 to 11 degrees Celsius. It was surprisingly found that maintaining the mixture at said temperature range reduces the chance of uncontrolled inversion of the water-continuous mixture to a fat-continuous mixture.

Mixing to Provide a Fat-Continuous Spread

The temperature of mixing at step 'c' is such that the temperature of the mixture of the water-phase and the fat powder and the liquid oil is preferably equal to or below 25 degrees Celsius. Thus depending on the temperature of the mixture of the water-phase and the fat powder the liquid oil may have to be cooled down prior to mixing. Suitable devices include for example a tubular heat exchanger or the like. However, it was found that a temperature at step 'c' of 15 degrees Celsius or higher stimulates the conversion of the water-continuous system to a fat-continuous system in the process according to the invention and further reduces processing time. Preferably the temperature of the mixture of liquid oil, fat powder and water-phase at step 'c' is from 15 to 25, more preferably 17 to 23 and even more preferably 18 to 21 degrees Celsius.

Food Product

Preferably the edible fat-continuous spread made according to the process of the invention comprises 5 to 45 wt. %, more preferably 10 to 35 wt. % and even more preferably 15 to 30 wt. % of fat, based on the total weight of the spread. Preferably the edible fat-continuous spread made according to the process of the invention comprises 55 to 95 wt. %, more preferably 65 to 90 wt. % and even more preferably 70 to 85 wt. % of a water-phase, based on the total weight of the spread.

The invention is now illustrated by the following non limiting examples.

EXAMPLES

Degassing Measuring Method

The amount of dispersed gas (i.e. gas-bubbles) in a liquid phase is reflected by its apparent density. This is determined by completely filling a cup of a known volume and weight with the mixture and observing the increase in weight. It is important that the cup is completely filled and that excess mixture rising above the rim of the cup is carefully removed. The density of the mixture wherein all gas-bubbles have been removed is taken as a 100% degassed mixture (i.e. having no gas bubbles).

Water Droplet Size Distribution of Spreads (D3,3 Measurement)

The normal terminology for Nuclear Magnetic Resonance (NMR) is used throughout this method. On the basis of this method the parameters D3,3 and exp(σ) (i.e. eˆsigma) of a lognormal water droplet size distribution can be determined. The D3,3 is the volume weighted mean droplet diameter and σ is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and σ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

A spread with is D3,3 of below 10 micrometer and an eˆsigma of below 2.8 is considered to be of good quality and stability.

Stevens Value

The Stevens value indicates a product's hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams. The Stevens value was determined at 5 degrees Celsius.

Spreadability

A flexible palette knife was used to spread a small amount of a spread on fat free paper. The resulting spreading screen was evaluated according to a standardized scale. A score of 1 represents a homogeneous and smooth product without any defects, a 2 indicates observable small spreading defects such as slightly inhomogeneous spreading or the presence of some vacuoles, a 3 indicates clearly observable defects, such as the appearance of free water or coarseness during spreading. A score of 4 or 5 refers to unacceptable products, where a 4 indicates a product which still has some spreading properties, but with an unacceptable level of defects.

A spread with a spreading score of at most 2 is considered to be of good quality and stability.

Free Water

After spreading a sample of a fat spread, the presence of free water was determined by using indicator paper (Wator, ref 906 10, ex Machery-Nagel, DE) which develops dark spots where free water is absorbed.

A six point scale is used to quantify the quality of fat spread (DIN 10 311):
  0 (zero) is a very stable and good product showing no perceivable coloring of the paper;
  1 (one) some lose of moisture (one or two spots, or the paper changes a little in color as a total);
  2 (two) as one but more pronounced;
  3 (three) as one but with a clear spots and color change of the paper;
  4 (four) indicator paper completely changes into a darker color;
  5 (five) the paper darkens completely and fast into the maximum level of color intensity.

Spreads with a score of 4 or 5 have an unacceptable level of free water. Spreads with a score of at most 2 have an acceptable occurrence of free water.

Spreads Product Composition

Edible spreads with a composition as in Table 1 were made according to the methods as described below.

TABLE 1

Spreads product formulation.

| INGREDIENT: | Weight % |
| --- | --- |
| Fat powder# | 5.85 |
| dimodan HP | 0.1 |
| Sunlec M | 0.05 |
| B-caroten 1% | 0.07 |
| Sunflower oil | 39 |
| Sodium chloride | 0.015 |
| Potassium sorbate | 0.09 |
| Butter milk powder | 0.15 |
| Flavour | 0.01 |
| Water | Balance |

Fat powder was obtained using a supercritical melt micronisation process similar to the process described in Particle formation of ductile materials using the PGSS technology with supercritical carbon dioxide, P.Münüklü, Ph.D.Thesis, Delft University of Technology, 16-12-2005, Chapter 4, pp. 41-51. The fat powder consisted of inES48: an interesterified mixture of 65% dry fractionated palm oil stearin with an Iodine Value of 14 and 35% palm kernel oil. Dimodan H P is a molecularly distilled mono/diacylglyceride mixture derived from fully hardened palm oil (90% monoglyceride) ex Danisco.

Sunlec M is hydrolysed sunflower lecithin.

Preparation of the Spread:

About half of the water was heated up to 80 degrees Celsius and the butter milk powder, sodium chloride, potassium sorbate, Dimodan H P, Sunlec M was added. The mixture was mixed using an ultra turrax T50 at 4000 rpm for 10 min. The remaining part of the water was pre-cooled to 5 degrees Celsius and added. The resulting water-phase was poured into an Esco Labor (EL3, ESCO-Labor AG, Riehen, CH), with a volume of 5 litre, and kept at 8 degrees Celsius and under gentle stirring at 100 rpm.

The sunflower oil was provided in a separate tank and maintained at 5 degrees Celsius also under gentle stirring at 100 rpm.

In the process according to Example 1, all the fat powder was added to the water-phase and subjected to a pressure of 15 KPa. More than 95% degassing was achieved within 12 min. After degassing the liquid oil was added.

In the process according to Example 2, all the fat powder and all the liquid oil was added to the water-phase and subjected to a pressure of 15 KPa. The mixture remained water-continuous during the subjection to the partial vacuum. More than 95% degassing was achieved within 12 min.

In the process according to Comparative A, all the fat powder was added to the liquid oil and subjected to a pressure of 15 KPa. More than 95% degassing was achieved at approximately 40 min. After degassing the water-phase was added.

The mixtures obtained in the process of Example 1, Example 2 and Comparative A were subsequently treated in a 150 ml double walled stainless steel pin stirrer, thermostated at 8° C. and operated at 2400 rpm, with two rows of 4 stator and rotor pins to provide the final spreads.

Characteristics of the Final Spread

Stable spreads could be made via the process of Example 2. Said spread were characterized by an average drop size (D3,3) of 7.2 micrometer, an e^sigma of 2.6 and a Stevens value of 127 as measured after 3 days of storage at 5 degrees Celsius right after production. After a total of 5 days at 5 degrees Celsius a spreading score of 1-2 and a free water score of 1-2 was observed. Therefore it is concluded that a process wherein fat powder is provided in a water-continuous mixture may result in a stable edible spread.

The invention claimed is:

1. A process for the preparation of an edible fat-continuous spread comprising a water phase and at most 45 wt. % of fat using liquid oil and a fat powder comprising structuring fat, comprising the steps of:
   a) providing a mixture comprising the water-phase and the fat powder, wherein the mixture is a water-continuous slurry formed by dispersing the fat powder in the water-continuous phase;
   b) subjecting said mixture to at least a partial vacuum comprising at most 5% of the ambient pressure; and
   c) mixing the mixture prepared at step 'b' to provide a fat-continuous spread;
   wherein the liquid oil may be added to the mixture in whole at any of steps 'b', or 'c' or when added in parts in any combination at steps 'b' and c'; and
   wherein the temperature of the mixture at least up to and during step 'b' is 8 to 11 degrees Celsius.

2. The process of claim 1, wherein the mixture at step 'b' is subjected to at least a partial vacuum for 1 to 60 minutes.

3. The process of claim 1, wherein the fat powder is obtained by supercritical melt micronization.

4. The process of claim 1, wherein the amount of structuring fat, based on the weight of the spread, is 1 to 20 wt.

5. The process of claim 1, wherein the temperature of the mixture at step 'c' is from 15 to 25 degrees Celsius.

6. The process of claim 1, wherein the amount of fat, based on the total weight of the spread, is 5 to 45 wt. %.

7. The process of claim 1, wherein the amount of water-phase, based on the total weight of the spread, is 55 to 95 wt.

8. The process of claim 1, wherein the water-phase comprises at least one gelling and/or thickening agent selected from the group consisting of physically and chemically modified starch.

9. The process of claim 1, wherein part of the liquid oil is added to the mixture at step 'b', or in parts at step 'b', to form a water-continuous mixture.

10. The process of claim 1, wherein the mixture at step 'b' is subjected to at least a partial vacuum for 8 to 15 minutes.

11. The process of claim 1, wherein the mixture at step 'b' is subjected to at least a partial vacuum of at most 5% of the ambient pressure for 8 to 15 minutes.

12. The process of claim 1, wherein 15 to 25 wt. % of the liquid oil is added at step 'b'.

13. A process for the preparation of an edible fat-continuous spread comprising a water phase and at most 45 wt. % of fat using liquid oil and a fat powder comprising structuring fat, comprising the steps of:
   a) providing a mixture comprising the water-phase and the fat powder, wherein the mixture is a water-continuous slurry formed by dispersing the fat powder in the water-continuous phase;
   b) subjecting said mixture to at least a partial vacuum comprising a pressure of 15 KPa or less for 8 to 15 minutes; and
   c) mixing the mixture prepared at step 'b' to provide a fat-continuous spread;
   wherein the liquid oil may be added to the mixture in whole at any of steps or 'c' or when added in parts in any combination at steps 'b' and c'; and
   wherein the temperature of the mixture at least up to and during step 'b' is 8 to 11 degrees Celsius.

14. A process for the preparation of an edible fat-continuous spread comprising a water phase and at most 45 wt. % of fat using liquid oil and a fat powder comprising structuring fat, comprising the steps of:
   a) providing a mixture comprising the water-phase and the fat powder, wherein the mixture is a water-continuous slurry formed by dispersing the fat powder in the water-continuous phase;
   b) subjecting said mixture to at least a partial vacuum, thereby degassing the mixture by at least 95%; and
   c) mixing the mixture prepared at step 'b' to provide a fat-continuous spread;
   wherein the liquid oil may be added to the mixture in whole at any of steps 'b', or 'c' or when added in parts in any combination at steps 'b' and c'; and
   wherein the temperature of the mixture at least up to and during step 'b' is 8 to 11 degrees Celsius.

15. The process of claim 1, wherein the fat powder consists essentially of structuring fat.

16. A process for the preparation of an edible fat-continuous spread comprising a water phase and at most 45 wt. % of fat using liquid oil and a fat powder comprising structuring fat, comprising the steps of:
   a) providing a mixture comprising the water-phase and the fat powder, wherein the mixture is a water-continuous slurry formed by dispersing the fat powder in the water-continuous phase;
   b) subjecting said mixture to at least a partial vacuum; and
   c) mixing the mixture prepared at step 'b' to provide a fat-continuous spread;
   wherein the liquid oil may be added to the mixture in whole at any of steps 'b', or 'c' or when added in parts in any combination at steps 'b' and 'c',
   wherein the temperature of the mixture at least up to and during step 'b' is 8 to 11 degrees Celsius; and wherein the fat powder comprises a structuring fat having a solid fat content N10 from 50 to 100, N20 from 26 to 95, and N35 from 5 to 60.

17. The process of claim 1, wherein the water-phase comprises a starch which has been cross-linked using phosphoric acid.

18. The process of claim 1, wherein the water-phase comprises tapioca starch which has been cross-linked using phosphoric acid.

* * * * *